United States Patent
Kinoshita

(10) Patent No.: US 7,404,034 B2
(45) Date of Patent: Jul. 22, 2008

(54) DISK DRIVE DEVICE, ELECTRONIC APPARATUS AND DISK CONTROL METHOD

(75) Inventor: Tadaaki Kinoshita, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 11/440,085

(22) Filed: May 25, 2006

(65) Prior Publication Data

US 2006/0288157 A1 Dec. 21, 2006

(30) Foreign Application Priority Data

Jun. 16, 2005 (JP) ............................. 2005-176594

(51) Int. Cl.
*G06F 12/00* (2006.01)
(52) U.S. Cl. ..................................... 711/113
(58) Field of Classification Search ........................ None
See application file for complete search history.

(56) References Cited

U.S. PATENT DOCUMENTS

| 5,889,629 | A  * | 3/1999 | Patton, III ..................... 360/75 |
| 6,520,013 | B1 * | 2/2003 | Wehrenberg ................. 73/489 |
| 6,735,037 | B1   | 5/2004 | Tanaka et al. |
| 6,768,066 | B2 * | 7/2004 | Wehrenberg ............. 200/61.49 |
| 7,031,092 | B2   | 4/2006 | Tanaka et al. |
| 7,164,634 | B2 * | 1/2007 | Dong et al. ............... 369/47.33 |
| 7,199,969 | B2 * | 4/2007 | Yoshida .................... 360/97.01 |
| 7,307,228 | B2 * | 12/2007 | Wehrenberg ............. 200/61.49 |
| 2003/0128475 | A1 * | 7/2003 | Wehrenberg ................. 360/250 |
| 2004/0105368 | A1 * | 6/2004 | Dong et al. ............... 369/47.33 |
| 2004/0252403 | A1 * | 12/2004 | Wehrenberg ................. 360/75 |
| 2005/0088773 | A1 * | 4/2005 | Yoshida ........................ 360/75 |
| 2005/0235385 | A1 * | 10/2005 | Wehrenberg ............... D14/125 |
| 2007/0168047 | A1 * | 7/2007 | Cromer et al. ................. 700/1 |

FOREIGN PATENT DOCUMENTS

| JP | 7-57416 | 3/1995 |
| JP | 11-25625 | 1/1999 |
| JP | 2005-50402 | 2/2005 |

* cited by examiner

*Primary Examiner*—Kevin Verbrugge
(74) *Attorney, Agent, or Firm*—Finnegan, Henderson, Farabow, Garrett & Dunner, L.L.P.

(57) ABSTRACT

According to one embodiment, a disk drive device includes a head, a register which stores various commands which are transmitted from the host device, a read/write process unit which executes a read/write control process including a write operation or a read operation, a cache memory which stores write data that is transmitted from the host device and read data that is read out of a disk medium, and a control unit which executes an unload operation of retreating the head to a retreat position that is located outside the disk medium in a case where an unload command is written in the register by the host device during execution of the read/write control process, and controls data transfer between the cache memory and the host device in accordance with the read command or the write command, thereby to continuously execute the read/write control process.

12 Claims, 9 Drawing Sheets

| Register file | | | |
|---|---|---|---|
| Read | Address/Offset | Written | |
| Data | 0x00 | Data | |
| Error | 0x01 | Features | |
| Sector Count | 0x02 | Sector Count | |
| LBA Low | 0x03 | LBA Low | |
| LBA Mid | 0x05 | LBA Mid | |
| LBA High | 0x06 | LBA High | |
| Device | 0x07 | Device | |
| Status | 0x08 | Command | |
| Alternate Status | 0x0E | Device Control | |
| LOAD/UNLOAD Status | 0x0F | LOAD/UNLOAD Control | |

| Offset | Name | 7:2 bit | 1 bit | 0 bit |
|---|---|---|---|---|
| 0x0F | LOAD_UNLOAD_CTR | Reserved | LOAD_STATUS | LOAD_CTR |

DISK DRIVE DEVICE, ELECTRONIC APPARATUS AND DISK CONTROL METHOD

CROSS-REFERENCE TO RELATED APPLICATIONS

This application is based upon and claims the benefit of priority from Japanese Patent Application No. 2005-176594, filed Jun. 16, 2005, the entire contents of which are incorporated herein by reference.

BACKGROUND

1. Field

One embodiment of the invention relates to a disk drive device including a head for data write/read to/from a disk medium, an electronic apparatus including the disk drive device, and a disk control method of controlling the disk drive device.

2. Description of the Related Art

In recent years, various portable electronic apparatuses, such as mobile phones and portable audio players, have been developed. In this type of portable electronic apparatuses, disk drive devices (hard disk drives (HDDs)) have recently been mounted more and more.

In the disk drive device, however, if the head strikes against a disk medium due to shock, etc. on the disk drive device, the surface of the disk medium would be damaged and normal data read from the disk medium would be disabled.

Under the circumstances, a disk drive device has been developed, which has a load/unload function for executing an unload operation of retreating the head to a retreat position, which is called "ramp", and a load operation of loading the head from the retreat position onto the disk medium.

Jpn. Pat. Appln. KOKAI Publication No. 11-25625 discloses a disk drive device having a function for surely unloading the head at the time of power-off. In this disk drive device, the unload operation is automatically executed after the completion of execution of a process which corresponds to a command that is issued from the host immediately before power-off.

Jpn. Pat. Appln. KOKAI Publication No. 7-57416 discloses a disk drive device which includes a vibration sensor. In this disk drive device, if vibration is sensed by the vibration sensor, the unload operation is automatically executed.

As regards the disk drive device that is mounted on the portable electronic apparatus, however, there is a demand for reduction in size and weight. It is practically difficult to mount such a vibration sensor within the disk drive device. It is thus necessary to provide the disk drive device, which is mounted on the portable electronic apparatus, with a function of executing the unload operation in response to a command from the host.

In the ATA (AT Attachment)/ATAPI (ATA Packet Interface)-7 standard, an "Unload immediately" command is defined as a command for instructing execution of the unload operation. However, the "Unload immediately" command is a command which can be issued only after a process corresponding to an immediately preceding command is completed. Thus, the host cannot issue the "Unload immediately" command during the read/write process.

There is an idea that a dedicated interrupt signal for starting the unload operation is supplied from outside to the disk drive device. In this case, however, a read/write process, which is currently being executed, is forcibly finished, and the data transfer between the host and the disk drive device is stopped before it is completely executed. In this case, in order to completely execute the forcibly finished data transfer, the host has to re-issue a read/write command.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a disk drive device includes: a head for executing data write on a disk medium and data read from the disk medium; a register which is configured to be accessible by a host device and stores various commands which are transmitted from the host device; a read/write process unit which executes a read/write control process including a write operation of controlling the head in accordance with a write command that is written in the register by the host device and writing write data, which is transmitted from the host device, on the disk medium, or a read operation of controlling the head in accordance with a read command that is written in the register by the host device and reading out data from the disk medium; a cache memory which stores the write data that is transmitted from the host device and the read data that is read out of the disk medium; and a control unit which executes an unload operation of retreating the head to a predetermined retreat position that is located outside the disk medium in a case where an unload command is written in the register by the host device during execution of the read/write control process, and controls data transfer between the cache memory and the host device in accordance with the read command or the write command, thereby to continuously execute the read/write control process.

Figure 1:
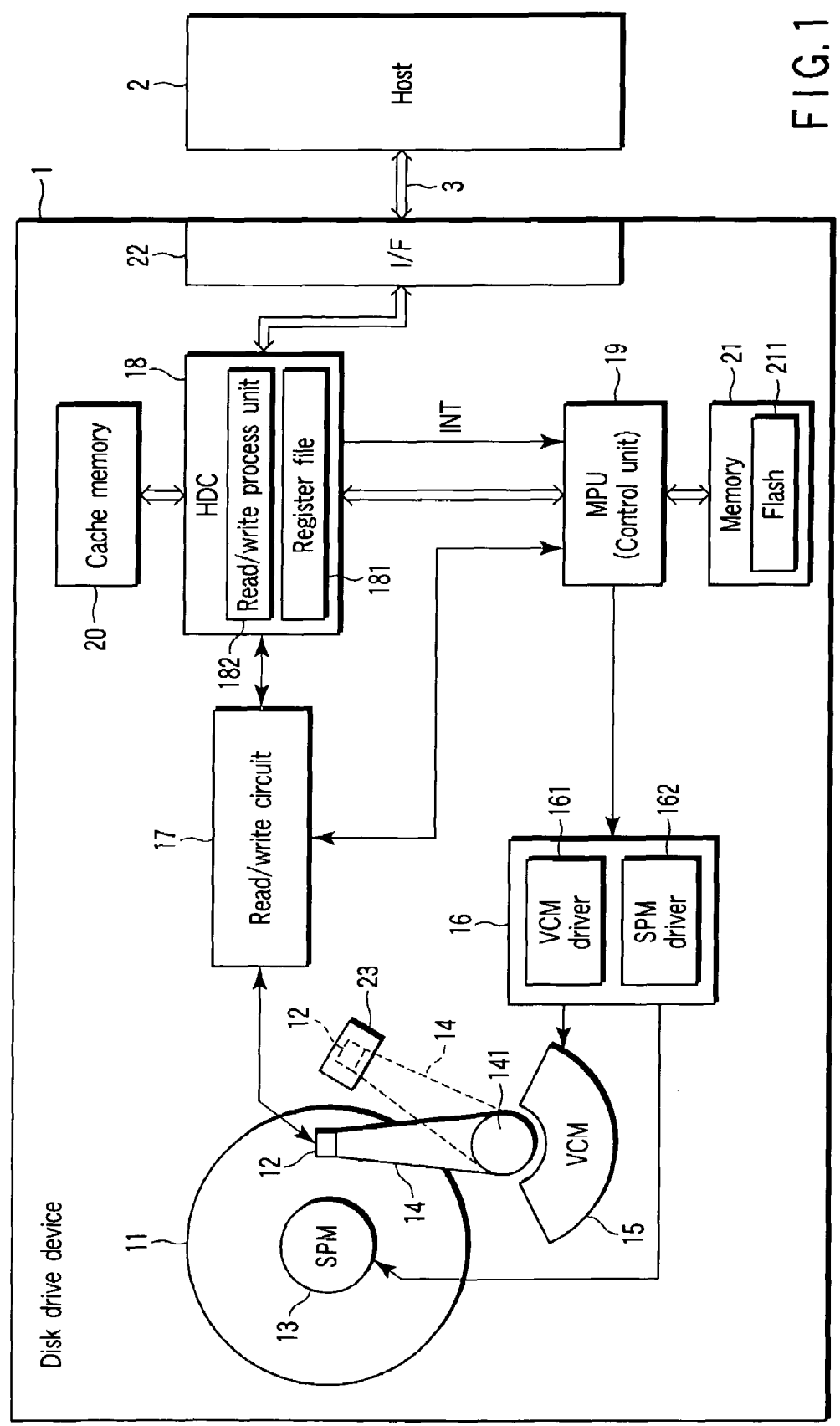
FIG. 1 is an exemplary block diagram showing a structure of a disk drive device according to an embodiment of the present invention.

FIG. 1 shows a structure of a disk drive device according to an embodiment of the invention. The disk drive device 1 is a device that is to be incorporated, as a storage device, in an electronic apparatus which functions as a host device 2. The disk drive device 1 is realized as a magnetic disk drive (hard disk drive (HDD)) in which data is magnetically recorded on a disk medium 11.

The disk drive device 1 comprises the disk medium 11, a head 12, a spindle motor (SPM) 13, an actuator 14, a voice coil motor (VCM) 15, a motor driver IC 16, a read/write circuit 17, a hard disk controller (HDC) 18, a microprocessor unit (MPU) 19, a cache memory 20, a memory 21, an interface circuit 22, and a ramp mechanism 23.

The disk medium 11 is a memory medium for magnetically recording data. The head 12 is a magnetic head and executes data write on the disk medium 11 and data read from the disk medium 11. The head 12 includes a read head for executing a read operation and a write head for executing a write operation. The head 12 is mounted at a distal end portion of the actuator 14.

The disk medium 11 is fixed to the spindle motor (SPM) 3. The spindle motor (SPM) 13 is a motor for rotating the disk medium 11. The actuator 14 is driven by the voice coil motor (VCM) 15 and moves the head 12 in a radial direction of the disk medium 11. The actuator 14 is composed of a head arm that is rotatably supported on a shaft 141.

The motor driver IC 16 comprises a VCM driver 161 for driving the voice coil motor (VCM) 15, and an SPM driver 162 for driving the spindle motor (SPM) 13. The VCM driver 161 and SPM driver 162 are controlled by the MPU 19.

The read/write circuit 17 is composed of a pre-amplifier circuit and a read/write channel. The pre-amplifier circuit includes a read amplifier which amplifies a read signal that is output from the read head, and a write amplifier. The write amplifier converts a write data signal, which is output from the read/write channel, to a write current signal, and sends the write current signal to the write head.

The HDC 18 includes a register file 181 which is accessible by the host device 2. The register file 181 includes command registers which store various commands that are sent from the host device 2. The HDC 18 also includes a read/write process unit 182. Under the control of the MPU 19, the read/write process unit 182 executes a read/write control process by using the read/write circuit 17. Specifically, the read/write process unit 182 executes a write operation of controlling the head 12 and writing write data, which is sent from the host device 2, on the disk medium 11 in accordance with a write command that is written in the command register by the host device 2, or a read operation of controlling the head 12 and reading data out of the disk medium 11 in accordance with a read command that is written in the command register by the host device 2. The functions of the read/write process unit 182 may be realized by the MPU 19.

The MPU 19 is a control unit which controls the operation of the disk drive device 1, and executes a program stored in the memory 21. The memory 21 includes a RAM, and a flash memory 211 that is a nonvolatile memory. The flash memory 211 stores the program that is executed by the MPU 19.

The MPU 19 has a function of controlling the read/write control process which is executed by the read/write process unit 182, and a load/unload control function of controlling the load/unload operation. The load/unload control function includes a function of executing an unload operation for driving the actuator 14 and retreating the head 11 to a predetermined retreat position which is located outside the disk medium 11, and a function of executing a load operation for driving the actuator 14 and loading the head 11 from the retreat position onto the disk medium 11. The ramp mechanism 23 is provided at the retreat position. When the unload operation is executed, the head 11 moves to the ramp mechanism 23. When the load operation is executed, the head 11 is taken out of the ramp mechanism 23 and moved onto the disk medium 11.

The cache memory 20 stores write data, which is transmitted from the host device 2, and read data which is read out of the disk medium 11. The cache memory 20 is composed of a write cache that stores write data and a read cache that stores read data.

The interface circuit 22 executes communication with the host device 2 via a bus 3 which connects the host device 2 and the disk drive device 1. The bus 3 is, for instance, an IDE (Integrated Drive Electronics) bus (also referred to as "parallel ATA bus"), a serial ATA bus, or an SD (SECURE DIGITAL) I/O bus.

Figures 2, 3:
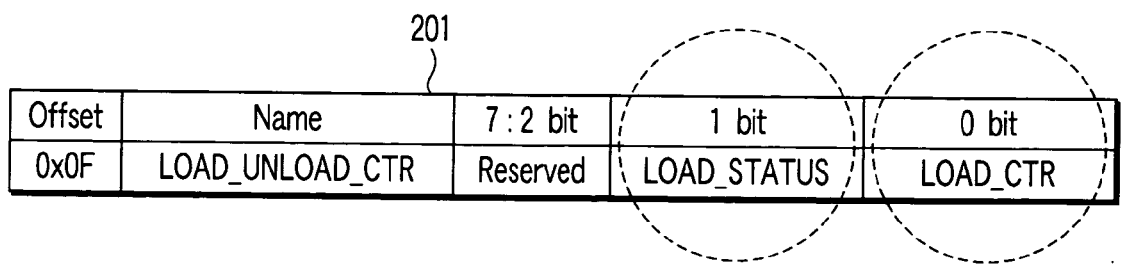
FIG. 2 shows a structure of a register file which is provided in the disk drive device shown in FIG. 1.
FIG. 3 shows a structure of a load control register which is provided in the register file shown in FIG. 2.

Referring now to FIG. 2, the structure of the register file 181 is described.

The register file 181 includes command registers 200 which are defined by the ATA standard, and a load/unload control (LOAD/UNLOAD Control) register 201.

In the command registers 200, the following registers are defined: a data (Data) register which stores write data/read data; a feature (Feature) register which stores special commands; a sector count (Sector Count) register which stores a value (Sector Count) that designates a data transfer size; three registers for storing logical block addresses (LBAs); a device (Device) register for storing a value that designates a device number; a command/status register which stores various commands/status; and a device control (Device Control)/alternate status (Alternate Status) register for storing a device control command such as a reset command, and a copy of a status.

The load/unload control (LOAD/UNLOAD Control) register 201 is a register which is configured to be writable/readable by the host device 2. The load/unload control register 201 is used to store a load command/unload command which is sent from the host device 2. The load/unload control register 201 is also used to store load/unload status information. The load/unload state information indicates one of a load state in which the head 12 is loaded on the disk medium 11 and an unload state in which the head 12 is retreated to the ramp mechanism 23. The host device 2 is able to confirm the state of the head 12 by reading the load/unload control register 201. The load/unload control register 201 and the command/status register may be realized by a single register.

FIG. 3 shows an example of the structure of the load/unload control (LOAD/UNLOAD Control) register 201.

In the load/unload control register 201, bit 0 is used to store load command "1"/unload command "0", which is written by the host apparatus 2. Bit 1 is used to store load/unload status information. In the description below, the bit 0 is referred to as "load control bit" and the bit 1 is referred to as "load status bit".

When the unload command "0" is written in the load control bit by the host device 2, the MPU 19 controls the VCM driver 16 to execute the unload operation. When the execution of the unload operation is completed, the MPU 19 writes status "0", which is indicative of the unload state of the head 12 (i.e. the state in which the head 12 is retreated to the ramp mechanism 23), in the load status bit.

When the load command "1" is written in the load control bit by the host device 2, the MPU 19 controls the VCM driver 16 to execute the load operation. When the execution of the load operation is completed, the MPU 19 writes status "1", which is indicative of the load state of the head 12 (i.e. the state in which the head 12 is positioned onto the disk medium 12), in the load status bit.

The HDC 18 generates an interrupt signal INT when the unload command "0" is written in the load control bit by the host device 2 while the read/write control process is being executed by the read command or write command, which is set in the command/status register. Responding to the interrupt signal INT, the MPU 19 reads the load control bit of the load/unload control register 201 and recognizes that the unload command "0" is written. Then, the MPU 19 executes the unload operation and retreats the head 12 to the ramp mechanism 23. In order to continue the read/write control process even while the head 12 is being retreated to the ramp mechanism 23, the MPU 19 controls the data transfer between the cache memory 20 and the host device 2 in accordance with the read command or write command, which is set in the command/status register.

The cache memory 20 has a memory capacity of, e.g. about 32 Mbytes or 64 Mbytes. Thus, in the write operation, even after the execution of the unload operation, the transfer of data from the host device 2 can continuously be accepted until the cache memory 20 stores write data of up to 32 Mbytes or 64 Mbytes. If no empty area is left in the cache memory 20 in the state in which the head 12 is retreated to the ramp mechanism 23, the MPU 19 executes a process for causing the host device 2 to temporarily stop sending write data until the load command "1" is written in the load control bit by the host device 2. For example, by sending a busy signal to the host device 2, it is possible to instruct the host device 2 to stop sending write data.

The host device 2 includes a vibration sensor. If vibration is sensed by the vibration sensor during data transfer with the disk drive device 1, the unload command "0" is written in the load control bit. If no vibration is sensed for a predetermined time period from the sending of the unload command "0", the load command "1" is written in the load control bit. In normal cases, since the load operation is executed immediately after the execution of the unload operation, the time in which the head 12 is retreated is relatively short. Thus, the loading/unloading of the head 12 can be executed while the data transfer with the host device 2 is continuously executed.

In the read operation, too, the transfer of read data to the host device 2 can continuously be executed as long as data that is designated by the read command is present in the cache memory 20. If the data that is designated by the read command is no longer present in the cache memory 20 in the state in which the head 12 is retreated, the MPU 19 stands by until the load command "1" is written in the load control bit by the host device 2 and stops sending read data to the host device 2 during this time.

Figure 4:
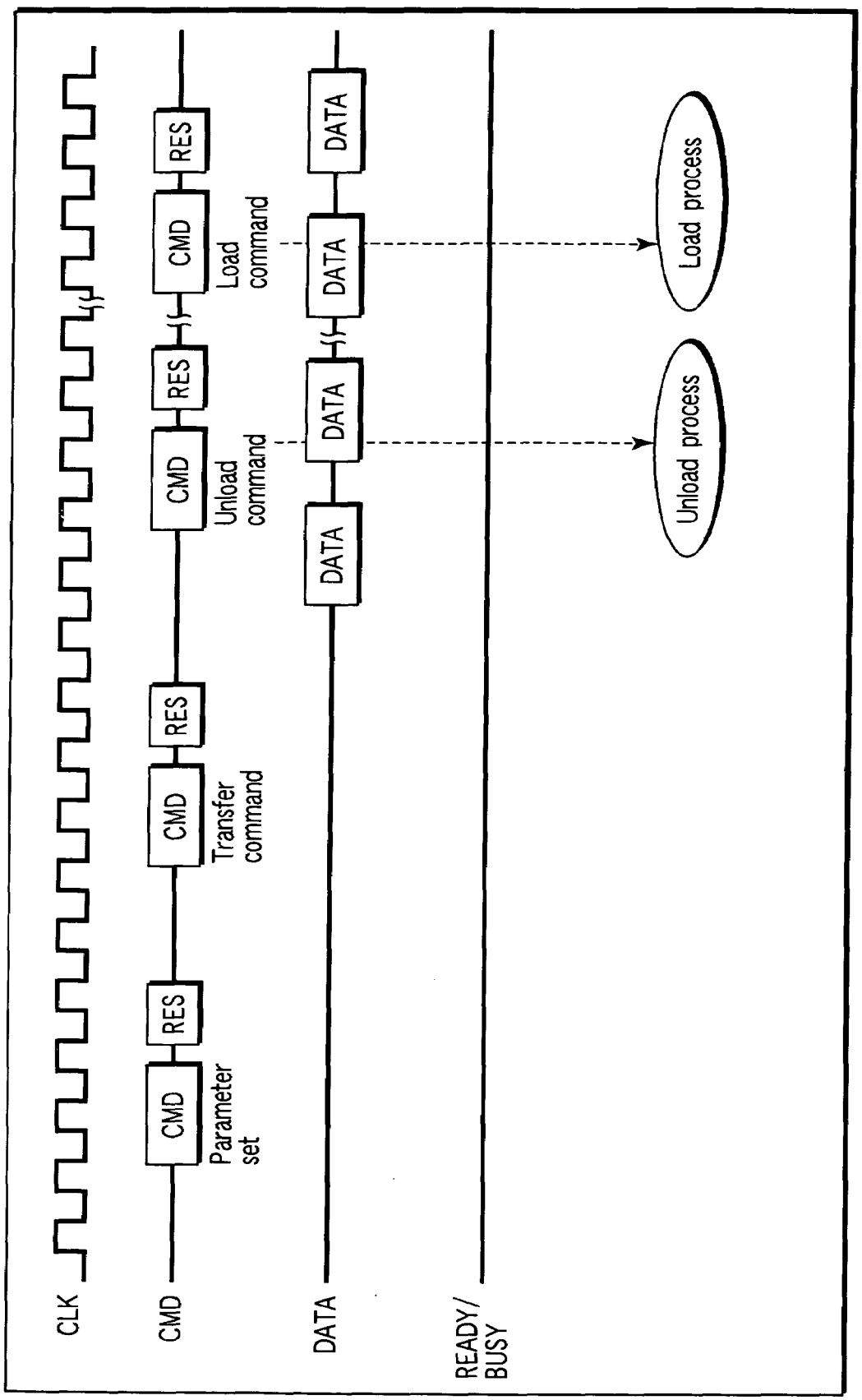
FIG. 4 shows an example of the interface between disk drive device shown in FIG. 1 and a host device.

FIG. 4 shows an example of the interface between the disk drive device 1 and the host device 2.

For example, a clock (CLK) signal line, a command (CMD) line, a data (DATA) bus and a ready/busy (READY/BUSY) signal line are defined in the bus 3 which is provided between the disk drive device 1 and host device 2.

The host device 2 writes various commands (CMD) in the register file 181 of the disk drive device 1 via the command (CMD) line. Upon receiving the command from the host device 2, the disk drive device 1 sends a response (RES) to the host device 2 via the command (CMD) line.

In the read process or write process, the host device 2 executes command transmission several times in order to write various parameters, such as transfer sizes, read/write types and addresses, in the command registers 200. Subsequently, the host device 2 writes a transfer command, which instructs start of data transfer, in the command registers 200. In response to the transfer command, data transfer between the host device 2 and disk drive device 1 (transmission of write data from the host device 2 to the disk drive device 1 or transmission of read data from the disk drive device 1 to the host device 2) is started via the data (DATA) bus.

If vibration is sensed during the data transfer period, the host device 2 writes the unload command in the load/unload control (LOAD/UNLOAD Control) register 201 of the disk drive device 1 via the command (CMD) line. The MPU 19 of the disk drive device 1 executes the unload operation. Even after the execution of the unload operation, the data transfer between the host device 2 and disk drive device 1 is continuously executed with use of the cache memory 20. If the load command is written in the load/unload control register 201 by the host device 2, the MPU 19 executes the load operation. Thereby, the write operation/read operation on the disk medium 11 is rendered executable.

As described above, in the present embodiment, even while the read/write process is being executed, the loading/unloading of the head 12 can be executed without finishing the read/write process. Hence, even after the unloading/loading of the head 12 is executed, the host device 2 can continuously execute the read/write process without re-executing processes such as setting of various parameters and setting of transfer commands. Therefore, the data transfer efficiency can greatly be improved.

Figure 5:
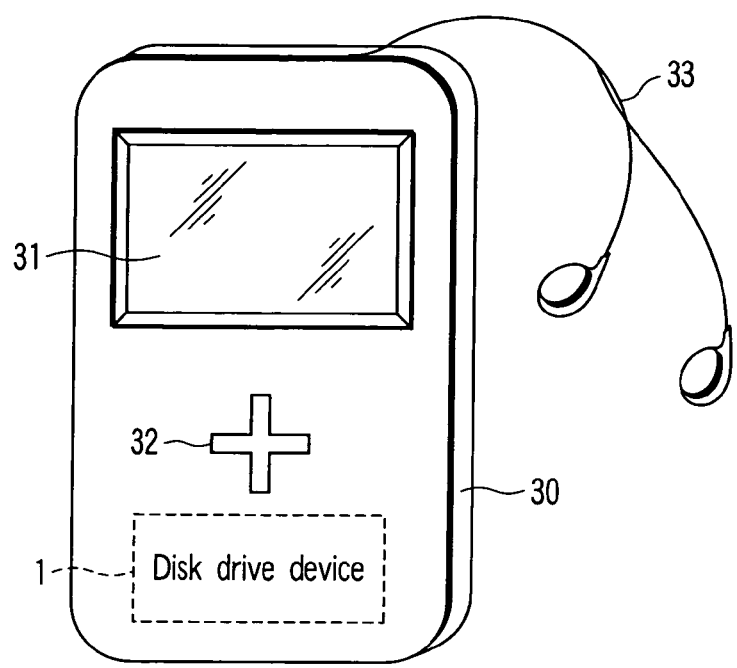
FIG. 5 is an exemplary perspective view showing an example of an electronic apparatus including the disk drive device shown in FIG. 1.

FIG. 5 shows an example of an electronic apparatus in which the disk drive device 1 is mounted.

The electronic apparatus is realized, for instance, as a mobile phone, a portable audio player or a portable TV. Assume now that the electronic apparatus is realized as the portable audio player.

The main body of a portable audio player 30 is provided with an LCD 31 that functions as a display device. An operation button 32 is provided on the main body of the portable audio player 30. In addition, the disk drive device 1 is built in the main body of the portable audio player 30 as a storage device for storing audio data, etc.

Figure 6:
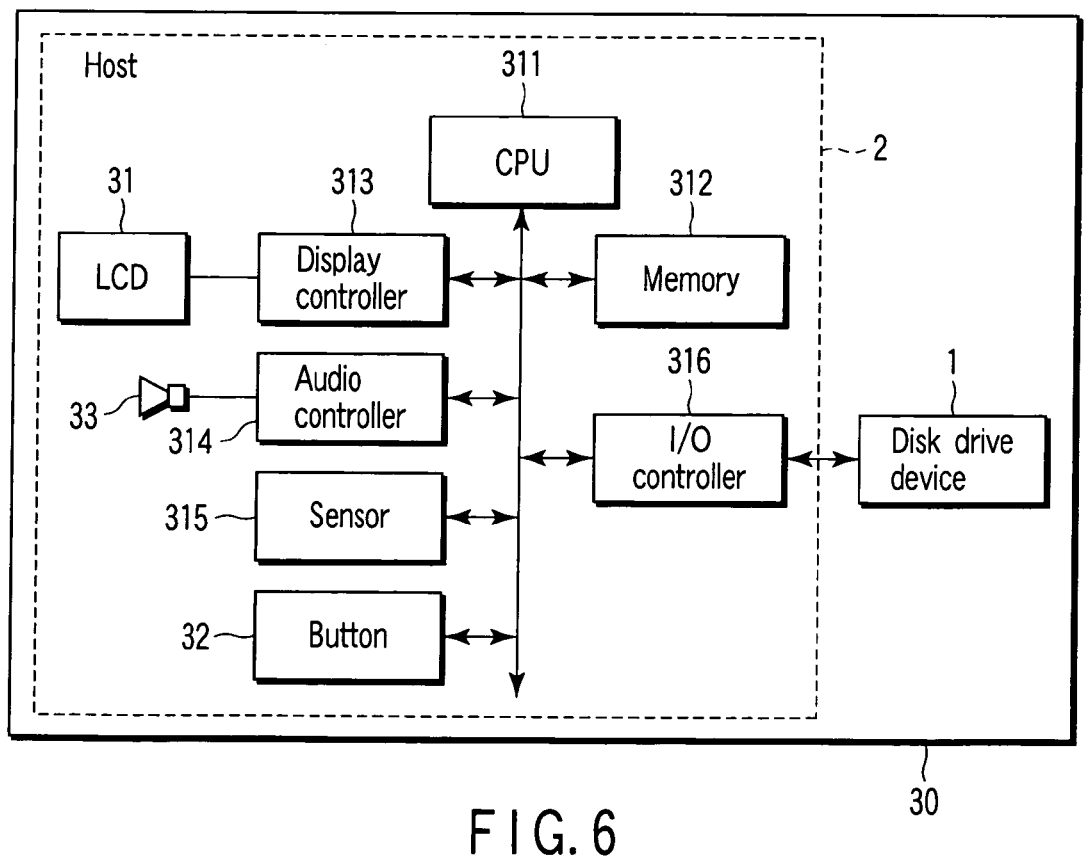
FIG. 6 is an exemplary block diagram showing a system configuration of the electronic apparatus shown in FIG. 5.

FIG. 6 is a block diagram showing the system configuration of the portable audio player 30.

The portable audio player 30 comprises a disk drive device 1 and a host device 2. The host device 2 includes, in addition to the above-mentioned LCD 31 and operation button 32, a CPU 311, a memory 312, a display controller 313, an audio controller 314, a sensor 315 and an I/O controller 316.

The CPU 311 is a processor for controlling the operation of the portable audio player 30, and executes a program that is stored in the memory 312. The display controller 312 controls the LCD 31. The audio controller 314 executes a process for reproducing audio data, which is read out of the disk drive device 1, and outputting the audio data as sound from headphones (or speakers) 33. The sensor 315 is a sensor for sensing vibration (sudden motion, etc.) of the portable audio player 30. The sensor 315 is composed of, e.g. a two-dimensional or three-dimensional acceleration sensor.

The I/O controller 316 is a controller which controls the disk drive device 1 to execute data transfer with the disk drive device 1. The I/O controller 316 is realized, for instance, as an IDE controller or an SD I/O host controller. If vibration is sensed by the sensor 315, the I/O controller 316 writes, under the control of the CPU 311, the above-described unload command in the load/unload control register 201 of the disk drive device 1. If no vibration is sensed by the sensor 315 for a predetermined time period after the unload command is written in the load/unload control register 201, the I/O controller 316 writes, under the control of the CPU 311, the above-described load command in the load/unload control register 201 of the disk drive device 1.

Figure 7:
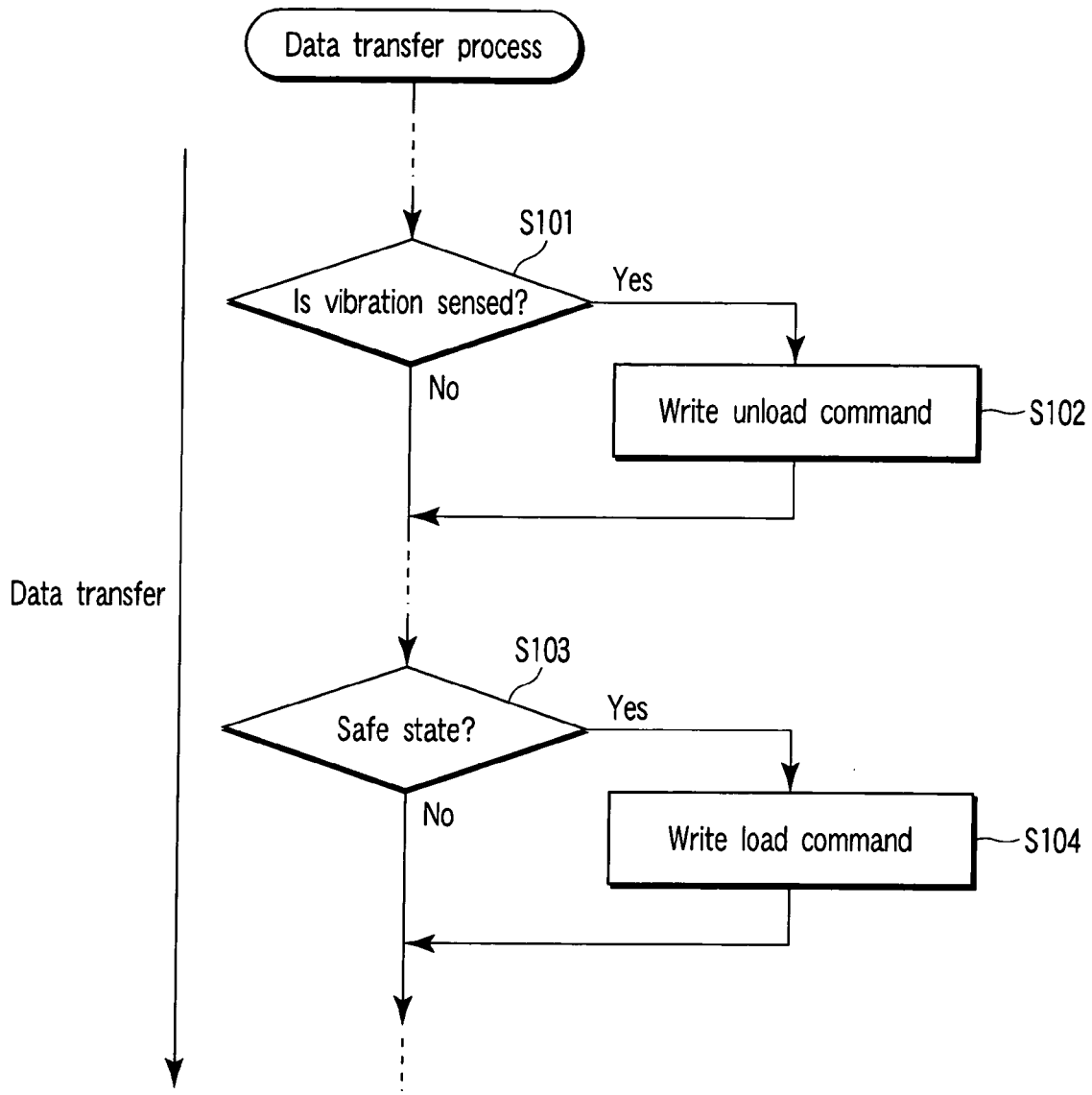
FIG. 7 is an exemplary flow chart illustrating the operation of the electronic apparatus shown in FIG. 5.

Next, referring to a flow chart of FIG. 7, the operation of the host device 2 is described.

If the user operates the operation button 32 to instruct reproduction of audio data, the CPU 311 instructs the I/O controller 316 to issue a read command. Thereby, transfer of audio data is started from the disk drive device 1 to the I/O controller 316. The I/O controller 316 writes the received audio data in the memory 312. The CPU 311 decodes the audio data as needed, and sends the decoded audio data to the audio controller 314. The audio controller 314 reproduces the audio data and outputs sound corresponding to the audio data from the headphones (or speakers) 33.

If vibration, which is greater than a reference value, is sensed by the sensor 315 during the transfer of audio data (YES in block S101), the CPU 311 instructs the I/O controller 316 to issue an unload command. The I/O controller 316 writes the unload command in the load/unload control (LOAD/UNLOAD Control) register 201 (block S102).

Then, the CPU 311 determines, on the basis of a vibration sensing result by the sensor 315, whether the portable audio player 30 has made a transit to a safe state (block S103). If it is confirmed that the portable audio player 30 is in the safe state, the CPU 311 instructs the I/O controller 316 to issue a load command. The I/O controller 316 writes the load command in the load/unload control (LOAD/UNLOAD Control) register 201 (block S104).

Even in the state in which the head 12 is unloaded, as long as audio data, which is designated by the read command, is present in the cache memory 20, the data transfer from the disk drive device 1 to the I/O controller 316 is continuously executed. Thereby, even after the head 12 is retreated, the reproduction of audio data can continuously be executed.

Figure 8:
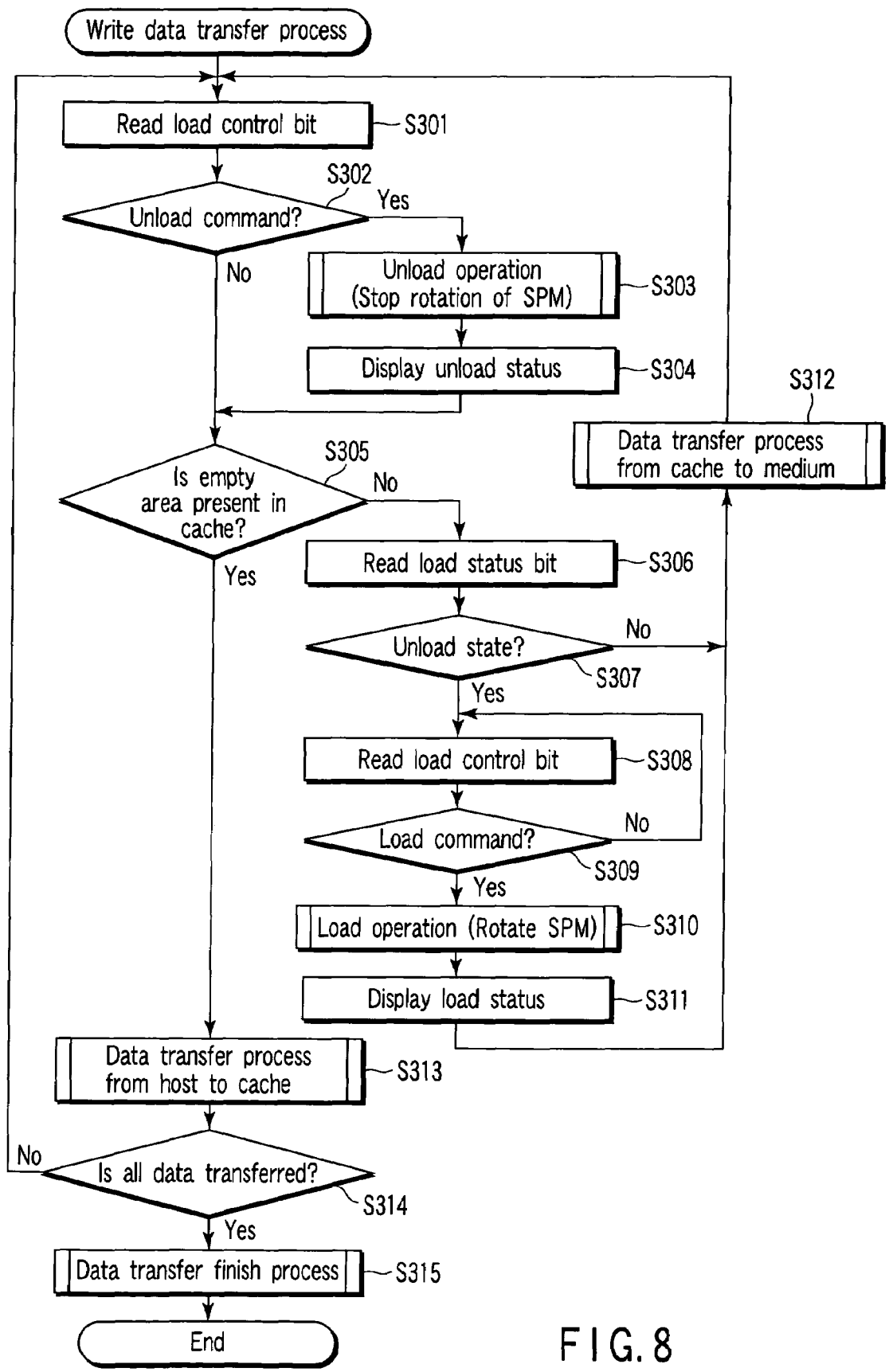
FIG. 8 is an exemplary flow chart illustrating a first example of the procedure of a write data transfer process which is executed by the disk drive device 1 shown in FIG. 1.

Next, referring to a flow chart of FIG. 8, a first example of the procedure of the write data transfer process, which is executed by the disk drive device 1, is described.

If a write command is written in the command control registers 200 by the host device 2, the MPU 19 instructs the HDC 18 to execute a write control process. The HDC 18 cooperates with the MPU 19 to control the head 12, thereby starting the write operation for writing write data, which is sent from the host device 2, on the disk medium 11.

If an interrupt signal INT is issued from the HDC 18 during the write control process, the MPU 19 executes a process of checking whether an unload command is written in the load/unload control (LOAD/UNLOAD Control) register 201 by the host device 2. Specifically, the MPU 19 reads the load control bit (block S301) and determines whether the unload command is written in the load/unload control register 201 by the host device 2 (block S302). If the unload command is written in the load/unload control register 201 (YES in block S302), the MPU 19 controls the actuator 14 via the driver IC 16, thereby executing the unload operation for retreating the head 12 to the ramp mechanism 23 (block S303). If the execution of the unload operation is completed, the MPU 19 writes status "0", which indicates that the head 12 is in the unload state (i.e. the state in which the head 12 is retreated to the ramp mechanism 23), in the load status bit (block S304).

Subsequently, the MPU 19 determines whether the cache memory 20 has an empty area for storing write data (block S305). If there is an empty area (YES in block S305), the MPU 19 controls the HDC 18 to transfer write data, which is sent from the host device 2, to the cache memory 20 (block S313).

The MPU 19 then determines whether transfer of all data is completed, that is, whether transfer of write data, which corresponds to a transfer data size designated by the write command, is completed (block S314). If the transfer of all data is completed (YES in block S314), the MPU 19 executes the data transfer finish process (block S315). In the data transfer finish process, for example, a process of informing the host device 2 of the end of the transfer process via the command control registers 200 is executed.

If the transfer of all data is not completed (NO in block S314), the MPU 19 returns to block S301.

If it is determined in block S305 that the cache memory 20 has no empty area, the MPU 19 reads the load status bit (block S306) and determines whether the head 12 is in the unload state in which the head 12 is retreated to the ramp mechanism 23 (block S307).

If the head 12 is not in the unload state, that is, if the head 12 is present on the disk medium 11 (NO in block S307), the MPU 19 causes the HDC 18 to execute a write operation for transferring and writing the write data, which is stored in the cache memory 20, on the disk medium 11 (block S312). Thereby, an empty area is secured in the cache memory 20.

If the head 12 is in the unload state (YES in block S307), the MPU 19 stands by until a load command is written in the load/unload control register 201 by the host device 2. Specifically, the MPU 19 reads the load control bit (block S308) and checks whether the load command is written in the load/unload control register 201 by the host device 2 (block S309). The process of blocks S308 and S309 is repeatedly executed until the load command is written in the load/unload control register 201 by the host device 2. During this time, the disk drive device 1 cannot accept write data from the host device 2. Thus, the MPU 19 executes a process of causing the host device 2 to temporarily stop transmitting write data. In this process, the MPU 19 causes, for example, the HDC 18 to execute a process of outputting a busy signal to the host device 2.

If the load command is written in the load/unload control register 201 by the host device 2 (YES in block S309), the MPU 19 controls the actuator 14 via the driver IC 16, thereby executing the load operation for loading the head 12 from the ramp mechanism 23 onto the disk medium 11 (block S310). If the load operation is completed, the MPU 19 writes status "1", which indicates that the head 12 is in the load state (i.e. the state in which the head 12 is present on the disk medium 11), in the load status bit (block S311).

Subsequently, the MPU 19 causes the HDC 18 to execute the write operation for transferring and writing the write data, which is stored in the cache memory 20, on the disk medium 11 (block S312). Thereby, an empty area can be secured in the cache memory 20.

In the above-described case, the cache memory 20 is used as a write-back cache. However, in the state in which the head 12 is loaded on the disk medium 11, the cache memory 20 may be used as a write-through cache, and a write operation for writing write data, which is sent from the host device 2, on the disk medium 11 and a write operation for writing write data in the cache memory 20 may be executed in parallel.

In order to prevent failure of the spindle motor (SPM) 13 due to dropping impact or the like, it is preferable to execute, in block S303, not only the unload operation but also a process of stopping the rotation of the disk medium 11.

In this case, in block S303, the MPU 19 controls the VCM driver 161 to execute the unload operation, and controls the SPM driver 162 to stop the rotation of the spindle motor (SPM) 13, thereby stopping the rotation of the disk medium 11. In addition, in block S310, the MPU 19 controls the VCM driver 161 to execute the load operation, and controls the SPM driver 162 to rotate the spindle motor (SPM) 13, thereby resuming the rotation of the disk medium 11.

Besides, the process of checking, in response to the interrupt signal, whether the unload command is written in the load/unload control register 201 by the host device 2 may be replaced with a process in which the MPU 19 executes, during the read control process, a polling process of periodically reading the load control bit, thereby checking whether the unload command is written in the load/unload control register 201 by the host device 2.

Figure 9:
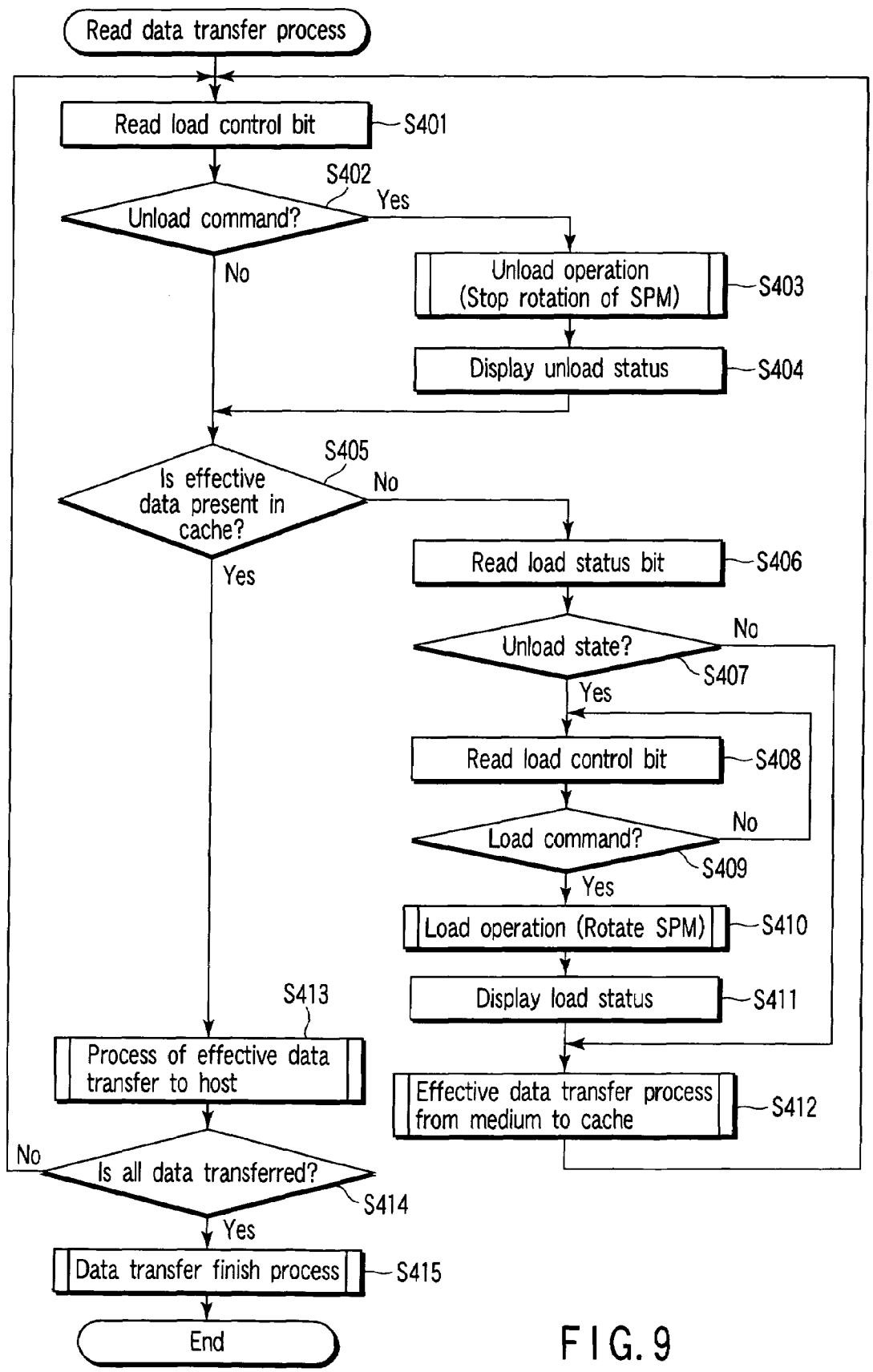
FIG. 9 is an exemplary flow chart illustrating a first example of the procedure of a read data transfer process which is executed by the disk drive device 1 shown in FIG. 1.

Next, referring to a flow chart of FIG. 9, a first example of the procedure of the read data transfer process, which is executed by the disk drive device 1, is described.

If a read command is written in the command control registers 200 by the host device 2, the MPU 19 instructs the HDC 18 to execute a read control process. The HDC 18 cooperates with the MPU 19 to control the head 12, thereby starting a process of reading data, which is designated by the read command from the host device 2, out of the disk medium 11 or cache memory 20 and transferring the read-out data to the host device 2.

If an interrupt signal INT is issued from the HDC 18 during the read control process, the MPU 19 reads the load control bit (block S401) and determines whether the unload command is written in the load/unload control register 201 by the host device 2 (block S402). If the unload command is written in the load/unload control register 201 (YES in block S402), the MPU 19 controls the actuator 14 via the driver IC 16, thereby executing the unload operation for retreating the head 12 to the ramp mechanism 23 (block S403). If the execution of the unload operation is completed, the MPU 19 writes status "0", which indicates that the head 12 is in the unload state (i.e. the state in which the head 12 is retreated to the ramp mechanism 23), in the load status bit (block S404).

Subsequently, the MPU 19 determines whether the cache memory 20 contains effective data (i.e. data designated by the read command) (block S405). If there is effective data (YES in block S405), the MPU 19 controls the HDC 18 to transfer effective data, which is stored in the cache memory 20, to the host device 2 (block S413).

The MPU 19 then determines whether transfer of all data is completed, that is, whether transfer of read data, which corresponds to a transfer data size designated by the read command, is completed (block S414). If the transfer of all data is completed (YES in block S414), the MPU 19 executes the data transfer finish process (block S415). In the data transfer finish process, for example, a process of informing the host device 2 of the end of the transfer process via the command control registers 200 is executed.

If the transfer of all data is not completed (NO in block S414), the MPU 19 returns to block S401.

If it is determined in block S405 that the cache memory 20 has no effective data, the MPU 19 reads the load status bit (block S406) and determines whether the head 12 is in the unload state in which the head 12 is retreated to the ramp mechanism 23 (block S407).

If the head 12 is not in the unload state, that is, if the head 12 is present on the disk medium 11 (NO in block S407), the MPU 19 causes the HDC 18 to execute a read operation for reading data, which is designated by the read command, out of the disk medium 11 (block S412). The data read out of the disk medium 11 is stored in the cache memory 20. Thereby, the effective data can be stored in the cache memory 20.

If the head 12 is in the unload state (YES in block S407), the MPU 19 stands by until a load command is written in the load/unload control register 201 by the host device 2. Specifically, the MPU 19 reads the load control bit (block S408) and checks whether the load command is written in the load/unload control register 201 by the host device 2 (block S409). The process of blocks S408 and S409 is repeatedly executed until the load command is written in the load/unload control register 201 by the host device 2.

If the load command is written in the load/unload control register 201 by the host device 2 (YES in block S409), the MPU 19 controls the actuator 14 via the driver IC 16, thereby executing the load operation for loading the head 12 from the ramp mechanism 23 onto the disk medium 11 (block S410). If the load operation is completed, the MPU 19 writes status "1", which indicates that the head 12 is in the load state (i.e. the state in which the head 12 is present on the disk medium 11), in the load status bit (block S411).

Subsequently, the MPU 19 causes the HDC 18 to execute the read operation for reading out the data, which is designated by the read command, from the disk medium 11 (block S412). The data read out of the disk medium 11 is stored in the cache memory 20. Normally, in block S412, not only the data designated by the read command but also data that follows the designated data is read out of the disk medium 11, and the read-out data is stored in the cache memory 20. Thereby, the data, which is highly likely to be requested by the host device 2, can be stored in the cache memory 20.

In the above-described case, the read data, which is read out of the disk medium 11, is transferred to the host device 2 via the cache memory 20. However, in the state in which the head 12 is loaded on the disk medium 11, an operation for transferring the read data from the disk medium 11 to the host device 2 and a write operation for writing the read data in the cache memory 20 may be executed in parallel.

In order to prevent failure of the spindle motor (SPM) 13 due to dropping impact or the like, it is preferable to execute, in block S403, not only the unload operation but also a process of stopping the rotation of the disk medium 11.

In this case, in block S403, the MPU 19 controls the VCM driver 161 to execute the unload operation, and controls the SPM driver 162 to stop the rotation of the spindle motor (SPM) 13, thereby stopping the rotation of the disk medium 11. In addition, in block S410, the MPU 19 controls the VCM driver 161 to execute the load operation, and controls the SPM driver 162 to rotate the spindle motor (SPM) 13, thereby resuming the rotation of the disk medium 11.

Besides, the process of reading the load control bit in response to the interrupt signal may be replaced with a process in which the MPU 19 executes, during the read control process, a polling process of periodically reading the load control bit.

Figure 10:
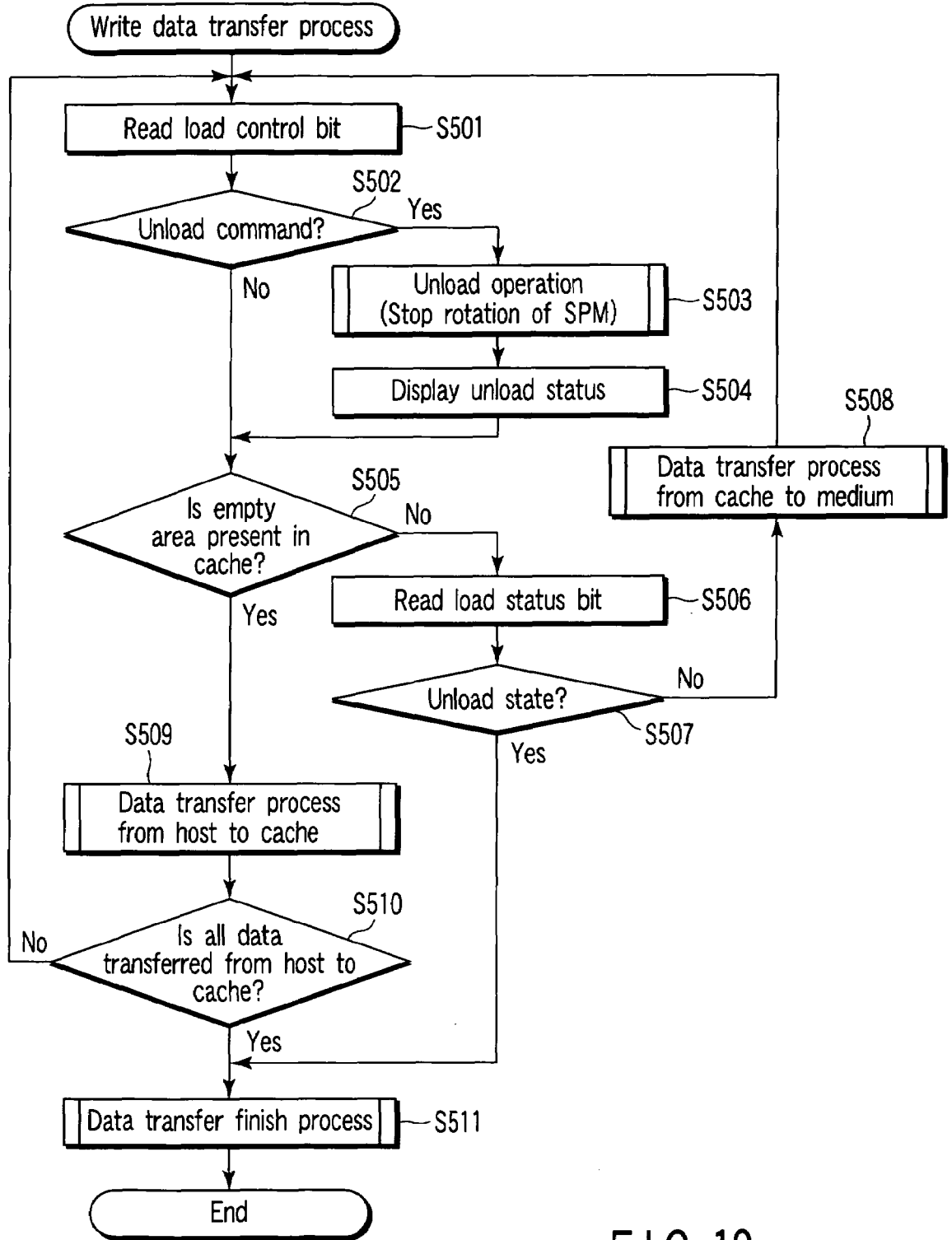
FIG. 10 is an exemplary flow chart illustrating a second example of the procedure of the write data transfer process which is executed by the disk drive device 1 shown in FIG. 1.

Next, referring to a flow chart of FIG. 10, a second example of the procedure of the write data transfer process, which is executed by the disk drive device 1, is described.

If a write command is written in the command control registers 200 by the host device 2, the MPU 19 instructs the HDC 18 to execute a write control process. The HDC 18 cooperates with the MPU 19 to control the head 12, thereby starting the write operation for writing write data, which is sent from the host device 2, on the disk medium 11.

If an interrupt signal INT is issued from the HDC 18 during the write control process, the MPU 19 reads the load control bit (block S501) and determines whether the unload command is written in the load/unload control register 201 by the host device 2 (block S502). If the unload command is written in the load/unload control register 201 (YES in block S502), the MPU 19 controls the actuator 14 via the driver IC 16, thereby executing the unload operation for retreating the head 12 to the ramp mechanism 23 (block S503). If the execution of the unload operation is completed, the MPU 19 writes status "0", which indicates that the head 12 is in the unload state (i.e. the state in which the head 12 is retreated to the ramp mechanism 23), in the load status bit (block S504).

Subsequently, the MPU 19 determines whether the cache memory 20 has an empty area for storing write data (block S505). If there is an empty area (YES in block S505), the MPU 19 controls the HDC 18 to transfer write data, which is sent from the host device 2, to the cache memory 20 (block S509).

The MPU 19 then determines whether transfer of all data is completed, that is, whether transfer of write data, which corresponds to a transfer data size designated by the write command, is completed (block S510). If the transfer of all data is completed (YES in block S510), the MPU 19 executes the data transfer finish process (block S511). In the data transfer finish process, for example, a process of informing the host device 2 of the end of the transfer process via the command control registers 200 is executed.

If the transfer of all data is not completed (NO in block S510), the MPU 19 returns to block S501.

If it is determined in block S505 that the cache memory 20 has no empty area, the MPU 19 reads the load status bit (block S506) and determines whether the head 12 is in the unload state in which the head 12 is retreated to the ramp mechanism 23 (block S507).

If the head 12 is not in the unload state, that is, if the head 12 is present on the disk medium 11 (NO in block S507), the MPU 19 causes the HDC 18 to execute a write operation for transferring and writing the write data, which is stored in the cache memory 20, on the disk medium 11 (block S508). Thereby, an empty area can be secured in the cache memory 20.

If the head 12 is in the unload state (YES in block S507), the MPU 19 executes the data transfer finish process in order to suspend the write control process by an error process (block S511). In the data transfer finish process, for example, a process of informing the host device 2 of an error end of the transfer process via the command control registers 200 is executed.

In the above-described case, the cache memory 20 is used as a write-back cache. However, in the state in which the head 12 is loaded on the disk medium 11, the cache memory 20 may be used as a write-through cache, and a write operation for writing write data, which is sent from the host device 2, on the disk medium 11 and a write operation for writing write data in the cache memory 20 may be executed in parallel.

In order to prevent failure of the spindle motor (SPM) 13 due to dropping impact or the like, it is preferable to execute, in block S503, not only the unload operation but also a process of stopping the rotation of the disk medium 11.

Besides, the process of reading the load control bit in response to the interrupt signal may be replaced with a process in which the MPU 19 executes, during the read control process, a polling process of periodically reading the load control bit.

Figure 11:
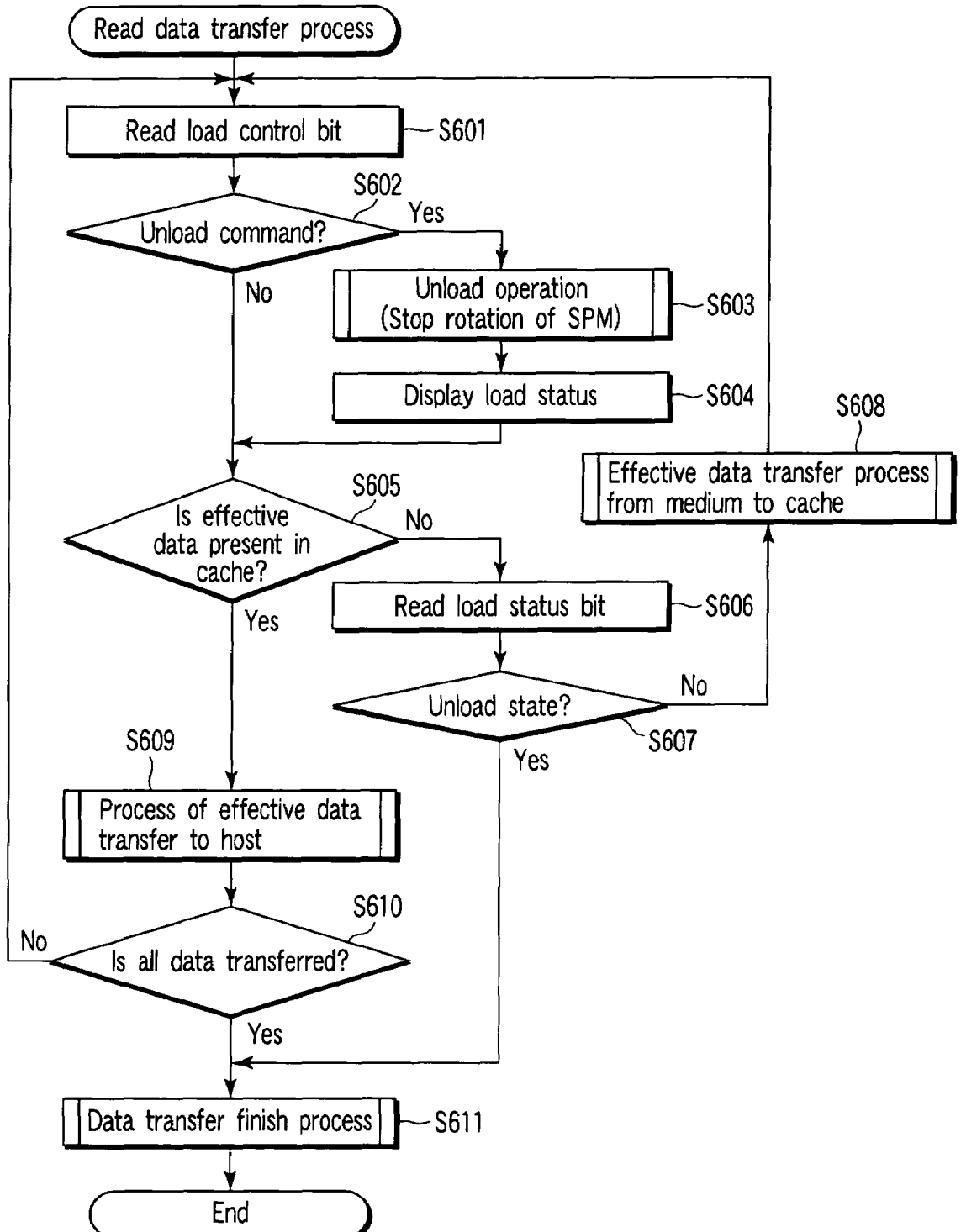
FIG. 11 is an exemplary flow chart illustrating a second example of the procedure of the read data transfer process which is executed by the disk drive device 1 shown in FIG. 1.

Next, referring to a flow chart of FIG. 11, a second example of the procedure of the read data transfer process, which is executed by the disk drive device 1, is described.

If a read command is written in the command control registers 200 by the host device 2, the MPU 19 instructs the HDC 18 to execute a read control process. The HDC 18 cooperates with the MPU 19 to control the head 12, thereby starting a process of reading data, which is designated by the read command from the host device 2, out of the disk medium 11 or cache memory 20 and transferring the read-out data to the host device 2.

If an interrupt signal INT is issued from the HDC 18 during the read control process, the MPU 19 reads the load control bit (block S601) and determines whether the unload command is written in the load/unload control register 201 by the host device 2 (block S602). If the unload command is written in the load/unload control register 201 (YES in block S602), the MPU 19 controls the actuator 14 via the driver IC 16, thereby executing the unload operation for retreating the head 12 to the ramp mechanism 23 (block S603). If the execution of the unload operation is completed, the MPU 19 writes status "0", which indicates that the head 12 is in the unload state (i.e. the state in which the head 12 is retreated to the ramp mechanism 23), in the load status bit (block S604).

Subsequently, the MPU 19 determines whether the cache memory 20 contains effective data (i.e. data designated by the read command) (block S605). If there is effective data (YES in block S605), the MPU 19 controls the HDC 18 to transfer effective data, which is stored in the cache memory 20, to the host device 2 (block S609).

The MPU 19 then determines whether transfer of all data is completed, that is, whether transfer of read data, which corresponds to a transfer data size designated by the read command, is completed (block S610). If the transfer of all data is completed (YES in block S610), the MPU 19 executes the data transfer finish process (block S611). In the data transfer finish process, for example, a process of informing the host device 2 of the end of the transfer process via the command control registers 200 is executed.

If the transfer of all data is not completed (NO in block S610), the MPU 19 returns to block S601.

If it is determined in block S605 that the cache memory 20 has no effective data, the MPU 19 reads the load status bit (block S606) and determines whether the head 12 is in the unload state in which the head 12 is retreated to the ramp mechanism 23 (block S607).

If the head 12 is not in the unload state, that is, if the head 12 is present on the disk medium 11 (NO in block S607), the MPU 19 causes the HDC 18 to execute a read operation for reading data, which is designated by the read command, out of the disk medium 11 (block S608). The data read out of the disk medium 11 is stored in the cache memory 20. Thereby, the effective data can be stored in the cache memory 20. Normally, in block S608, not only the data designated by the read command but also data that follows the designated data is read out of the disk medium 11, and the read-out data is stored in the cache memory 20. Thereby, the data, which is highly likely to be requested by the host device 2, can be stored in the cache memory 20.

If the head 12 is in the unload state (YES in block S607), the MPU 19 executes the data transfer finish process in order to suspend the read control process by an error process (block S611). In the data transfer finish process, for example, a process of informing the host device 2 of an error end of the transfer process via the command control registers 200 is executed.

In the above-described case, the read data, which is read out of the disk medium 11, is transferred to the host device 2 via the cache memory 20. However, in the state in which the head 12 is loaded on the disk medium 11, an operation for transferring the read data from the disk medium 11 to the host device 2 and a write operation for writing the read data in the cache memory 20 may be executed in parallel.

In order to prevent failure of the spindle motor (SPM) 13 due to dropping impact or the like, it is preferable to execute, in block S601, not only the unload operation but also a process of stopping the rotation of the disk medium 11.

Besides, the process of reading the load control bit in response to the interrupt signal may be replaced with a process in which the MPU 19 executes, during the read control process, a polling process of periodically reading the load control bit.

As has been described above, according to the present embodiment, the unload operation can be executed by the control from the host device 2 while the read process or write process is being continued. In addition, the MPU 19 reads, during the read/write process, the load/unload control register 201 in response to the generation of the interrupt signal or by polling. Thereby, the MPU 19 determines whether the unload command is written in the load/unload control register 201 by the host device 2. Therefore, even during the read/write process, the unload operation can immediately be executed.

In the case where the disk drive device 1 is configured to stop the rotation of the spindle motor (SPM) 13 when the unload operation is executed, the host device 2 can make use of the unload command in order to reduce power consumption of the disk drive device 1. Furthermore, instead of stopping the rotation of the spindle motor (SPM) 13, it is possible to execute a control to decrease the number of revolutions of the spindle motor (SPM) 13 at the time of executing the unload operation and to restore the number of revolutions of the spindle motor (SPM) 13 to the normal speed at the time of executing the load operation.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive device comprising:
    a head for executing data write on a disk medium and data read from the disk medium;
    a register which is configured to be accessible by a host device and stores various commands which are transmitted from the host device;
    a read/write process unit which executes a read/write control process including a write operation of controlling the head in accordance with a write command that is written in the register by the host device and writing write data, which is transmitted from the host device, on the disk medium, or a read operation of controlling the head in accordance with a read command that is written in the register by the host device and reading out data from the disk medium;
    a cache memory which stores the write data that is transmitted from the host device and the read data that is read out of the disk medium; and
    a control unit which executes an unload operation of retreating the head to a predetermined retreat position that is located outside the disk medium in a case where an unload command is written in the register by the host device during execution of the read/write control process, and controls data transfer between the cache memory and the host device in accordance with the read command or the write command, thereby to continuously execute the read/write control process.

2. The disk drive device according to claim 1, wherein the control unit is configured to execute, during the execution of the read/write control process, a process of reading the register and determining whether the unload command is written in the register by the host device.

3. The disk drive device according to claim 1, wherein the control unit is configured to execute, in a case where a load command is written in the register by the host device in a state in which the head is retreated to the predetermined retreat position, a load operation of loading the head on the disk medium, and to cause the read/write process unit to execute the read operation or the write operation.

4. The disk drive device according to claim 1, wherein the control unit includes:
    means for executing, in a case where a load command is written in the register by the host device in a state in which the write command is written in the register and the head is retreated to the predetermined retreat position, a load operation of loading the head on the disk medium, and causing the read/write process unit to execute the write operation; and
    means for executing, in a case where no empty area is present in the cache memory in a state in which the head is retreated to the predetermined retreat position, a process of causing the host device to temporarily suspend transmission of the write data until the load command is written in the register by the host device.

5. The disk drive device according to claim 1, wherein the control unit includes:
    means for executing, in a case where a load command is written in the register by the host device in a state in which the read command is written in the register and the head is retreated to the predetermined retreat position, a load operation of loading the head on the disk medium, and causing the read/write process unit to execute the read operation; and
    means for keeping a standby state until the load command is written in the register by the host device, in a case where data which is designated by the read command is no longer present in the cache memory in a state in which the head is retreated to the predetermined retreat position.

6. The disk drive device according to claim 1, wherein the control unit includes:
    means for writing first status data, which indicates that the head is retreated to the predetermined retreat position, in the register after execution of the unload operation;
    means for executing, in a case where a load command is written in the register by the host device, a load operation of loading the head on the disk medium and causing the read/write process unit to execute the read operation or the write operation; and
    means for writing second status data, which indicates that the head is loaded on the disk medium, in the register after execution of the load operation.

7. The disk drive device according to claim 1, wherein the control unit is configured to execute a process of stopping rotation of the disk medium in a case where the unload command is written in the register by the host device during execution of the read/write control process.

8. The disk drive device according to claim 1, wherein the control unit is configured to execute a process of stopping rotation of the disk medium in a case where the unload command is written in the register by the host device during execution of the read/write control process, and to execute, in a case where a load command is written in the register by the host device in a state in which the head is retreated to the predetermined retreat position, a process of resuming the rotation of the disk medium, a load operation of loading the head on the disk medium and a process of causing the read/write process unit to execute the read operation or the write operation.

9. An electronic apparatus including a disk drive device and a host device which controls the disk drive device,
wherein the disk drive device comprises a head for executing data write on a disk medium and data read from the disk medium; a register which is configured to be accessible by a host device and stores various commands which are transmitted from the host device; a read/write process unit which executes a read/write control process including a write operation of controlling the head in accordance with a write command that is written in the register by the host device and writing write data, which is transmitted from the host device, on the disk medium, or a read operation of controlling the head in accordance with a read command that is written in the register by the host device and reading out data from the disk medium; a cache memory which stores the write data that is transmitted from the host device and the read data that is read out of the disk medium; and a control unit which executes an unload operation of retreating the head to a predetermined retreat position that is located outside the disk medium in a case where an unload command is written in the register by the host device during execution of the read/write control process, and controls data transfer between the cache memory and the host device in accordance with the read command or the write command, thereby to continuously execute the read/write control process, and the host device comprises a sensor which senses vibration, and an I/O controller which controls the disk drive device to execute data transfer with the disk drive device and writes the unload command in the register of the disk drive device in a case where vibration is sensed by the sensor.

10. The electronic apparatus according to claim 9, wherein the control unit is configured to execute, in a case where a load command is written in the register by the host device in a state in which the head is retreated to the predetermined retreat position, a load operation of loading the head on the disk medium, and to cause the read/write process unit to execute the read operation or the write operation, and the I/O controller is configured to write the load command in the register of the disk drive device in a case where no vibration is sensed by the sensor for a predetermined time after the unload command is written in the register.

11. A disk control method of controlling a disk drive device, the disk drive device including a head for executing data write on a disk medium and data read from the disk medium; a register which is configured to be accessible by a host device and stores various commands which are transmitted from the host device; a read/write process unit which executes a read/write control process including a write operation of controlling the head in accordance with a write command that is written in the register by the host device and writing write data, which is transmitted from the host device, on the disk medium, or a read operation of controlling the head in accordance with a read command that is written in the register by the host device and reading out data from the disk medium; and a cache memory which stores the write data that is transmitted from the host device and the read data that is read out of the disk medium, the method comprising:

executing an unload operation of retreating the head to a predetermined retreat position that is located outside the disk medium in a case where an unload command is written in the register by the host device during execution of the read/write control process; and controlling data transfer between the cache memory and the host device in accordance with the read/write command, thereby to continuously execute the read/write control process.

12. The disk control method according to claim 11, further comprising executing, in a case where a load command is written in the register by the host device in a state in which the head is retreated to the predetermined retreat position, a load operation of loading the head on the disk medium, and causing the read/write process unit to execute the read operation or the write operation.

* * * * *